(12) United States Patent  
Khan

(10) Patent No.: US 7,079,856 B2
(45) Date of Patent: Jul. 18, 2006

(54) DATA FLOW CONTROL BETWEEN A BASE STATION AND A MOBILE STATION

(75) Inventor: Farooq Ullah Khan, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 439 days.

(21) Appl. No.: 10/117,513

(22) Filed: Apr. 5, 2002

(65) Prior Publication Data

US 2004/0203973 A1 Oct. 14, 2004

(51) Int. Cl.
*H04B 7/00* (2006.01)
(52) U.S. Cl. .................. 455/517; 455/509; 455/41.1
(58) Field of Classification Search ............... 455/41.1, 455/517, 506, 509, 450, 452.2, 41.2, 41.3, 455/852.1; 370/278, 282, 230, 231, 236; 375/396, 370
See application file for complete search history.

(56) References Cited

U.S. PATENT DOCUMENTS

| | | | |
|---|---|---|---|
| 4,375,102 A | | 2/1983 | Van Daal |
| 4,905,234 A | | 2/1990 | Childress et al. |
| 5,701,312 A | | 12/1997 | DeLuca et al. |
| 6,134,693 A | * | 10/2000 | Fukuda .................. 714/750 |
| 6,289,003 B1 | * | 9/2001 | Raitola et al. ............ 370/278 |
| 6,330,435 B1 | * | 12/2001 | Lazraq et al. ........... 455/412.1 |
| 6,519,731 B1 | * | 2/2003 | Huang et al. ............ 714/751 |
| 6,529,572 B1 | * | 3/2003 | Rasanen .................. 375/377 |
| 2001/0053140 A1 | * | 12/2001 | Choi et al. .............. 370/335 |
| 2003/0126282 A1 | * | 7/2003 | Sarkar et al. ............ 709/237 |

OTHER PUBLICATIONS

Q.931 ISDN user-network interface layer 3, specs for basic call control ITU-T , [Online] May 1998, XP002252310 Retrieved from the Internet: er/controller?event= SHARED_ DOC_CHECK&prod=SPECS3&sess= 10625865&LOGINNAME=null&linkSource=SEARCH& page=doc&docld=QEDOIAAAAAAAAAA A> [retrieved on Aug. 25, 2003].

* cited by examiner

*Primary Examiner*—Edan Orgad

(57) ABSTRACT

A method of data flow control between a mobile and base station of a wireless communication system where the mobile is transferring wirelessly part or all of the data received from the base station to a local device in accordance with a standard such as Bluetooth or Wi-Fi. The rate at which the mobile is receiving data from the base station is typically much higher than the rate at which the mobile is transferring the data to the local device. The mobile sends a STOP data flow control command to the base station causing the base station to either stop transmitting data or transmit data at a lower data rate thus prevention mobile buffer overflow and loss of data from occurring. When conditions are favorable for reception of data, the mobile sends START data flow control commands to the base station allowing the base station to resume transmitting data at a higher data rate. The higher data rate may be equal to the original established data rate.

12 Claims, 3 Drawing Sheets

DATA FLOW CONTROL BETWEEN A BASE STATION AND A MOBILE STATION

FIELD OF THE INVENTION

The present invention generally relates to communication systems and in particular to wireless communication systems.

DESCRIPTION OF THE RELATED ART

As wireless communication systems evolve, there is an increasing need to accommodate wireless communication systems that not only convey (i.e., transmit and/or receive) voice but also allow data information to be conveyed between users of the communication system. The data information is various types of digital information such as text, graphics and other digital information that are typically not time sensitive. Information such as voice or video are time sensitive in that once transmission has commenced there can be no appreciable delay in subsequent transmissions. Any appreciable delay in consecutive transmissions of the time sensitive information causes the information to become unintelligible to a receiving user equipment (i.e., a mobile station). Data information, on the other hand, can tolerate delays in consecutive transmissions and thus can be processed differently from time sensitive signals.

Wireless communication systems such as systems that comply with the well known 1x-EV-DO (cdma 2001x-Evolution-Data Optimized) and 1xEV-DV (cdma 2001x-Evolution-Data Voice) standards as well as the High Speed Downlink Packet Access (HSDPA) specification in the Universal Mobile Telecommunication System (UMTS) standard can accommodate the conveyance of data information and are hereinafter referred to wireless data systems. A standard is a set of protocols established by standard bodies such as industry groups and/or governmental regulatory bodies. A protocol is generally a set of rules that dictate how communication is to be initiated, maintained and terminated between system equipment and/or user equipment of the communication system. The wireless data systems are structured in substantially the same manner as other wireless communication systems in that they comprise a plurality of base stations each located in a cell. A cell is a geographical area defined by physical boundaries. Each cell has base station equipment (or cell site) that services user equipment (UE) located in that cell. The UE is being serviced when the base station equipment provides the UE with appropriate amounts of one or more resources (e.g., power, bandwidth) to enable the UE to convey adequately information to other users or other system equipment Base station equipment is generally system equipment comprising communication equipment (e.g., radio transmitters, receivers, processing equipment) owned, controlled and operated by system providers. System providers are entities such as local telephone companies, long distance telephone companies, Internet Service Providers (ISP) and other communication service providers. Examples of UE include cellular telephones, pagers and wireless personal computers.

A UE receives information from base station equipment over a downlink and transmits information to base station equipment over an uplink. The uplink comprises at least one traffic channel and at least one signaling channel. Similarly, the downlink comprises at least one signaling channel and at least one traffic channel. The signaling channels are communication channels used by the system to manage, and otherwise control the operation of communication channels of the communication system. In a UMTS, the downlink signaling channel is called the High Speed Shared Control CHannel (HS-SCCH) and the uplink signaling channel is called the High Speed Dedicated Physical Control CHannel (HS-DPCCH). The traffic channel is a communication channel over which user information (e.g., voice, video, data) is conveyed between UEs of the communication system.

In wireless data systems, the UE is now able to transmit and receive data wirelessly to local devices such as a portable computer and a Personal Digital Assistant (PDA). Communication standards such as Bluetooth and Wi-Fi define protocols that allow a UE to wirelessly communicate with local devices. In both Wi-Fi and Bluetooth, the communication between the UE and the local device is limited to several hundred feet. Thus, the UE now becomes a communication node that is part of the overall wireless data system. For example, in many situations the UE receives data over a downlink traffic channel from a base station and transfers the data to a local device. Thus, there is a local wireless communication channel between the UE and the local device; the operation of the local wireless communication channel, as previously discussed, is dictated by such standards as Bluetooth and Wi-Fi.

The data rate of the downlink traffic channel is typically significantly greater than the data rate of the local channel. For example, for a UMTS system the downlink traffic channel data rate can be 1.2–10 Mb/s whereas the bit rate for a Bluetooth communication channel is limited to 728 Kb/s. Therefore, a bottleneck may occur at the UE in circumstances where a base station is transmitting data to the UE at a relatively much higher rate than the rate the UE is transferring the data to a local device. In the event of a bottleneck, the UE will simply, at some point, not be able to process incoming data fast enough resulting in the loss of significant amounts of data. The UE may be equipped to buffer some of the incoming data, but eventually a buffer overflow will occur. Another cause of a bottleneck is that the UE is unable to process the data as fast as it is received over the downlink.

One attempt at solving the bottleneck is for the UE to send a reconfiguration signal to the UE informing the UE to either stop transmitting or to switch to a relatively much lower data rate. One disadvantage with this reconfiguration signal is that it is transmitted over an uplink signaling channel to the base station. In many systems, such as the UMTS, the uplink signaling is not as heavily coded as the downlink signaling channel. Coding refers to a technique of adding redundancies in the transmitted information to make the transmitted information more robust with respect to communication channel anomalies that cause the transmitted information to be received with errors. Thus, there is a chance that the reconfiguration signal is received in error and thus the base station does not recognize this signal in which case the base station would continue to transmit data to the UE at the relatively high data rate. Another disadvantage to the use of a reconfiguration signal is that the base station takes some time to switch to a relatively lower data rate upon reception and recognition of the reconfiguration signal. Therefore, the UE would continue to transmit data to the UE at the relatively high data rates. Thus, there is a need to perform data flow control between the base station and the UE to prevent a bottleneck from occurring at the UE.

SUMMARY OF THE INVENTION

The present invention provides a method for controlling data flow between a UE and system equipment. The method uses two way signaling between the UE and system equipment to perform data flow control. First a set of data flow control commands is provided which is used by the UE to control the flow of data over the downlink traffic channel and/or the data rate of the downlink traffic channel. The system responds to a command from the UE with a confirmation response informing the UE that the command was received and understood. The commands from the UE and the confirmation response from the system equipment are transmitted over an uplink signaling channel and a downlink signaling channel respectively.

For example, the UE first determines that flow control is needed based on one or more conditions that lead to loss of received data by the UE. The UE is in RECEIVE mode in which it receives data from the system equipment and transfers at least a portion of the received data to a device via a local wireless or wireline communication channel. Also, in the RECEIVE mode the UE transmits CQI information to the system equipment which is used by the system equipment to modify parameters of its transmit signals that are carrying the data being received by the UE. After determining that flow control is needed, the UE transmits STOP commands to the system equipment until it receives a confirmation response, ACK-STOP, from the system equipment. Upon reception of the ACK-STOP confirmation response, the UE enters into a SUSPEND mode. When the system equipment receives the STOP commands, it transmits an ACK-STOP response to the UE and it stops transmitting data to the UE over the traffic channel and also enters into a SUSPEND mode. During the SUSPEND mode, the UE sends HOLD commands to the system equipment until the conditions change to allow reception of data. When the UE determines that favorable conditions exist so as to allow reception of data from the system equipment, it transmits START commands to the system equipment. The system equipment responds with an ACK-START confirmation response, which when received by the UE causes the UE to enter into the RECEIVE mode. In another embodiment, when the UE receives a confirmation response (e.g., ACK-START, ACK-STOP) from the system equipment, it sends a response confirming that it received the confirmation from the system equipment before it enters into the RECEIVE or SUSPEND mode.

DETAILED DESCRIPTION

The present invention provides a method for controlling data flow between a UE and system equipment. The method uses two way signaling between the UE and system equipment to perform data flow control. First a set of data flow control commands is provided which is used by the UE to control the flow of data over the downlink traffic channel and/or the data rate of the downlink traffic channel. The system responds to a command from the UE with a confirmation response informing the UE that the command was received and understood. The commands from the UE and the confirmation response from the system equipment are transmitted over an uplink signaling channel and a downlink signaling channel respectively.

For example, the UE first determines that flow control is needed based on one or more conditions that lead to loss of received data by the UE. The UE is in RECEIVE mode in which it receives data from the system equipment and transfers at least a portion of the received data to a device via a local wireless or wireline communication channel. Also, in the RECEIVE mode the UE transmits CQI information to the system equipment which is used by the system equipment to modify parameters of its transmit signals that are carrying the data being received by the UE. After determining that flow control is needed, the UE transmits STOP commands to the system equipment until it receives a confirmation response, ACK-STOP, from the system equipment. Upon reception of the ACK-STOP confirmation response, the UE enters into a SUSPEND mode. When the system equipment receives the STOP commands, it transmits an ACK-STOP response to the UE and it stops transmitting data to the UE over the traffic channel and also enters into a SUSPEND mode. During the SUSPEND mode, the UE sends HOLD commands to the system equipment until the conditions change to allow reception of data. When the UE determines that favorable conditions exist so as to allow reception of data from the system equipment, it transmits START commands to the system equipment. The system equipment responds with an ACK-START confirmation response, which when received by the UE causes the UE to enter into the RECEIVE mode. In another embodiment, when the UE receives a confirmation response (e.g., ACK-START, ACK-STOP) from the system equipment, it sends a response confirming that it received the confirmation response from the system equipment before it enters into the RECEIVE or SUSPEND mode.

Figure 1:
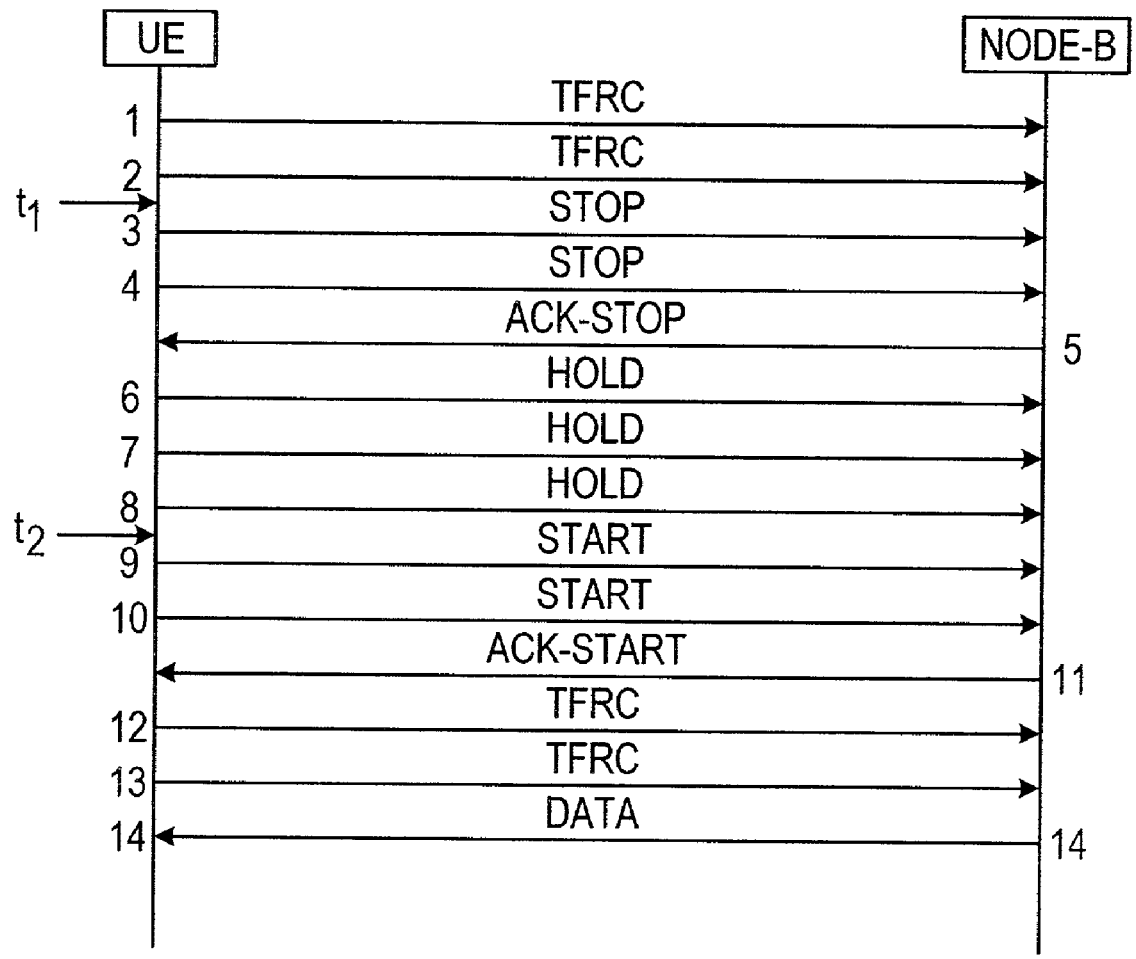
FIG. 1 shows a data flow control procedure between a UE and a base station as per the method of the present invention.

Referring now to FIG. 1, there is shown an example of a data flow control procedure between a UE and a base station. It will be noted that the example of the method of the present invention will be discussed in the context of a communication system that complies with the UMTS standard. The data flow control commands from the UE are transmitted over signaling channel HS-DPCCH and the confirmation responses from the base station are transmitted over the HS-SCCH. The system equipment is typically the base station equipment, which in UMTS parlance is called a Node-B. The UE typically transmits Channel Quality Indicator (CQI) information to the base station over the HS-DPCCH. The channel quality information is information that characterizes the quality of a communication channel between a UE and a Node-B. The Node-B uses the CQI information to modify parameters (i.e., modulation, coding and number of channelization codes or Walsh codes) of its transmitted signals so as to reduce the effects of channel anomalies on the transmitted signals which are carrying the information being received by the UE. For systems that comply with the UMTS standard, the CQI is referred to as Transport Format and Resource Control (TFRC). It should be understood that the method of the present invention is applicable to other communication systems (wireline and wireless) that convey voice and data information.

Continuing with FIG. 1, the UE is in a RECEIVE mode wherein it transmits TRFC information to the Node-B to allow the Node-B to modify its transmitted signals to reduce the anomalous effects of the downlink traffic channel on the transmitted signals. UE transmits a TFRC during a Transmission Time Interval (TTI) which is a defined period of time during which signaling information and user information are conveyed. The TFRC is represented by a 5-bit block of information thereby creating 32 possible TFRC information (TRFC 0–TRFC 31). The method of the present invention uses three of the TFRC information to represent STOP, HOLD and START data flow control commands. In particular, the first 29 TFRC (TFRC 0–TFRC 28) information remain the same while TRFC 29 now represents a STOP command, TFRC 30 represents a HOLD command and TRFC 31 represents a START command.

Between the second and the third TTI, at time $t_1$, the UE has determined that data flow control is needed. The UE makes this determination based on conditions that tend to create an overflow. Received data is typically buffered at the UE; events such as when the buffer is filled past a threshold or when the buffer starts to overflow will trigger a need for data flow control by the UE. At the third TTI, the UE transmits a STOP command to the Node-B and continues to do so in ensuing TTIs until it receives a response from the Node-B. In the example shown, the Node-B responds with a confirmation message to the UE during the fifth TTI. In particular, the Node-B transmits an ACK-STOP confirmation message indicating to the UE that the STOP command was received and understood.

Once the Node-B receives a STOP flow control command from a UE, the Node-B stops transmitting data over the downlink traffic channel to the UE. Both the UE and the Node-B enter into a SUSPEND mode during which no data is transmitted over the downlink traffic channel. During the SUSPEND mode, the UE transmits HOLD flow control commands (over the HS-DPCCH) to maintain the Node-B in the SUSPEND mode. In another embodiment, instead of stopping data transmissions, the Node-B will continue to transmit data to the UE but at a data rate that is lower than an established data rate between the UE and the Node-B; this lower data rate can be defined by the system provider. The UE and the Node-B will remain in the SUSPEND mode until the UE has determined that conditions are such that it can start to receive data from the Node-B. The UE makes this determination between the $8^{th}$ and $9^{th}$ TTI at time $t_2$. The UE transmits a START command and continues to do so until it receives an ACK-START confirmation message from the Node-B. Upon reception of the ACK-START confirmation message during the $11^{th}$ TTI, the UE returns to the RECEIVE mode wherein it receives data from the Node-B. The Node-B starts resumes transmission of data (or continues to transmit data, but at the original established rate or at a rate higher) than the lower data rate) to the UE after it has received TFRC information (during the $12^{th}$ and $13^{th}$ TTI) from the UE informing the Node-B as to how to modify its transmissions to reduce the effects of channel anomalies on transmitted signals.

Figure 2:
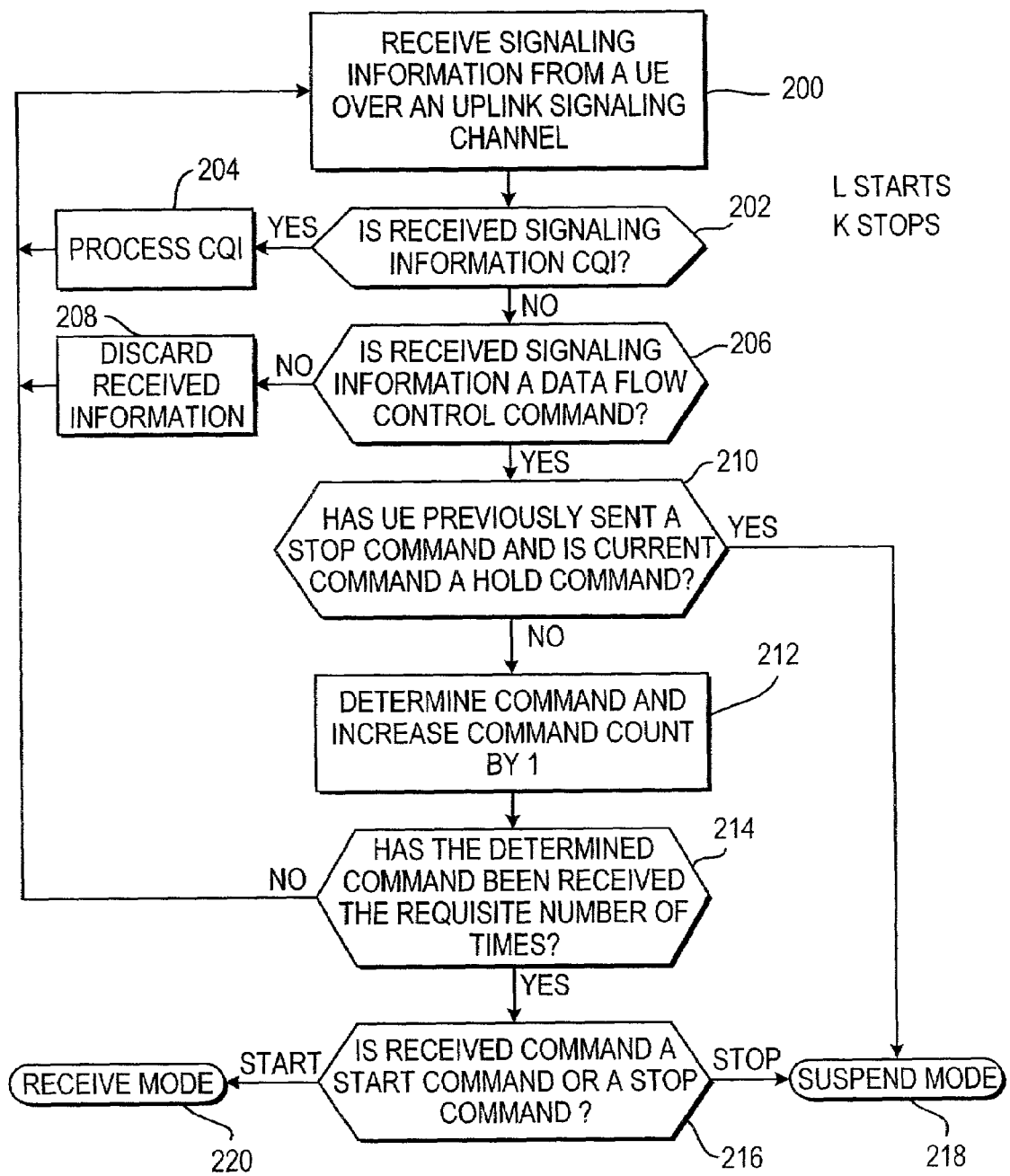
FIG. 2 depicts a flow chart of the method of the present invention as performed by system equipment of a communication system.

Referring now to FIG. 2, there is shown the method of the present invention as practiced by system equipment. In step 200, the system equipment (e.g., Node-B) receives signaling information over an uplink signaling channel from a UE. The system equipment is in a RECEIVE mode wherein it is transmitting data at an established data rate to a UE over a downlink traffic channel. The established data rate is a rate defined by the system provider or by the protocol being followed by the communication system. The established data rate can change from TTI to TTI and depends on the downlink channel quality estimates received in CQI feedback. In step 202, the system equipment determines whether the received information is CQI. If the received signaling information is CQI, the method of the present invention moves to step 204 where it process the received CQI as per a protocol being followed by the communication system and continues to monitor the uplink signaling channel for ensuing signaling information.

In step 206, if the received signaling information is not CQI and is not a data flow control command, the received signaling information is discarded and the system equipment continues to monitor the uplink signaling channel for ensuing signaling information. If the received signaling information is a data flow control command the method of the present invention moves to step 210. In step 210, if the current command is a HOLD command that is following a STOP command, the UE and the system equipment are in the SUSPEND mode wherein no data is transmitted from the system equipment to the UE. In another embodiment during the SUSPEND mode, the system equipment continue to transmit data to the UE, but at a rate that is lower than the established data rate; i.e., in the alternative embodiment of this invention, the lower rate is used in the SUSPEND mode. Accordingly the method of the present invention moves to step 218 where the system equipment remains in the SUSPEND mode until it receives a START command from the UE.

If the current command is not a HOLD command, the system equipment determines the command that was received and increases that command count by 1. The method of the present invention requires that a command be sent a certain number of times to the system equipment. In particular, a START command is to be sent L number of times where L is an integer equal to 1 or greater. A STOP command is to be sent K times where K is an integer equal to 1 or greater. K and L are not necessarily equal to each other. Thus, the system equipment counts the number of times a STOP or START command is sent. If the requisite number of times has not been met, the method of the present invention moves to step 200 to wait for ensuing signaling information. Once the requisite number of times has been met, the method of the present invention moves to step 216 where the system equipment moves to RECEIVE mode (step 220) if the command was a START command. In the RECEIVE the system equipment resumes transmission of data to the UE in the alternative embodiment transmits data to the UE at the established data rate or at a rate that is higher than the lower rate of the SUSPEND mode. If the command was a STOP command, the system equipment moves to a SUSPEND mode (step 218) and stays in that mode until it receives a START command from the UE.

Figure 3:
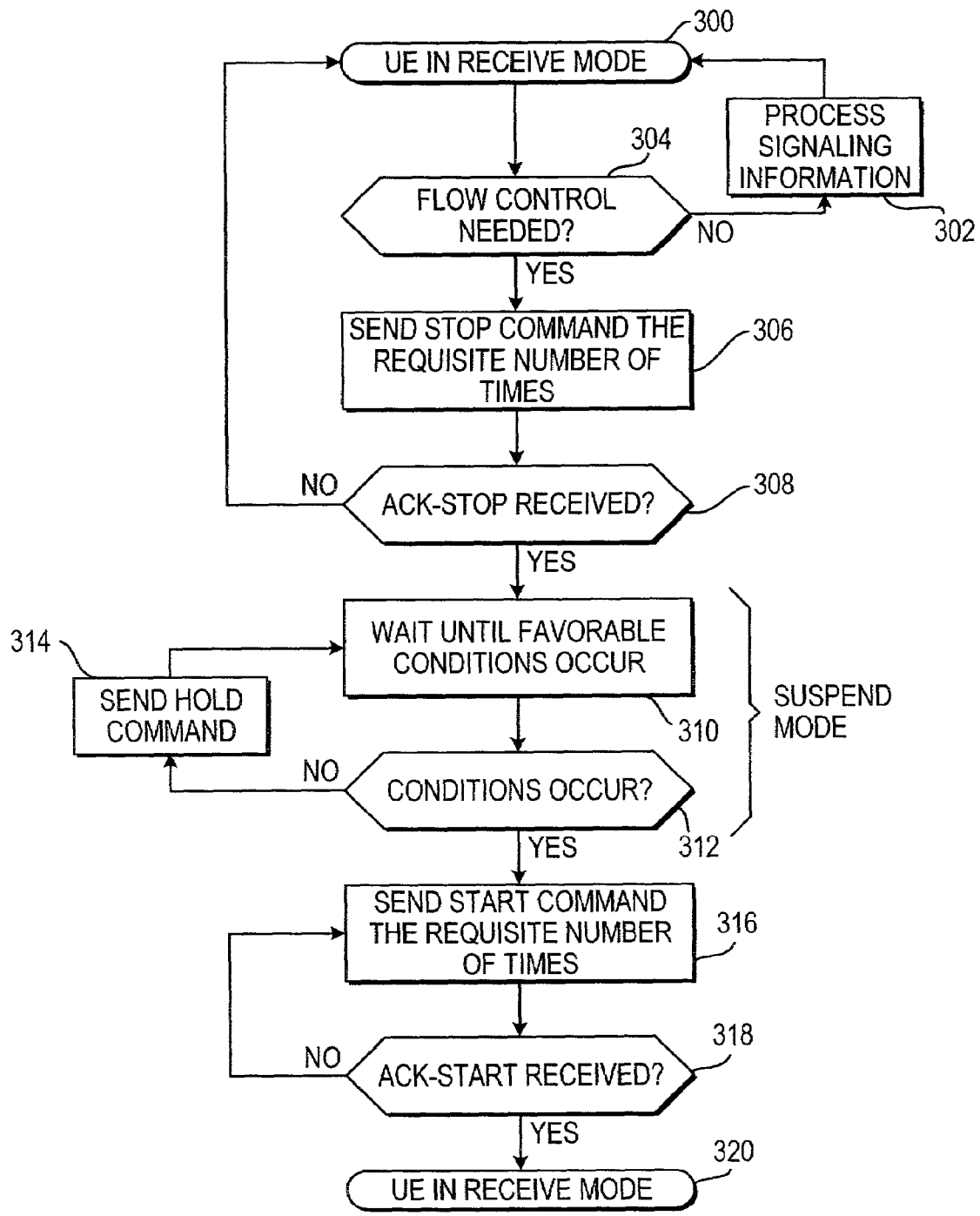
FIG. 3 depicts a flow chart of the method of the present invention as performed by user equipment of a communication system.

Referring now to FIG. 3, there is shown the method of the present invention as practiced by a UE. In step 300 the UE is in RECEIVE mode; that is, the UE is able to receive data traffic from the system equipment (e.g., Node-B) at an established data rate and the UE transmits CQI information (e.g., TFRC) to the system equipment which uses such CQI information to modify various parameters (e.g., signal phase, signal amplitude) of its transmitted signals. The transmitted signals carry the information that is being received by the UE. In step 304, the UE determines if data flow control is needed. The UE decides on whether data flow control is needed based one or more factors. These factors include whether an overflow in the UE's data buffer has occurred or whether the UE's buffer has been filled past a defined threshold. The UE may consider other factors which affect the UE's ability to transfer the received data to a device over a local communication channel that complies with a standard such as Bluetooth or Wi-Fi. Bluetooth enables short-range wireless links between mobile computers, mobile telephones, portable handheld devices and connectivity to the Internet. Wi-Fi is short for wi-reless fi-delity and is another name for IEEE 802.11b based wireless LANs (Local Area Networks). The UE may also transfer the data through wire connections such as an RS-232 printer cable or a USB cable connected to a personal computer. If flow control is not needed, the method of the present invention moves to step 302 and processes the received signaling information in accordance with the protocol being followed by the communication system; in such a case, the UE remains in the RECEIVE mode. If flow control is needed, the method of the present invention moves to step 306.

In step 306, the UE sends a STOP command over the uplink signaling channel to the system equipment. The STOP command is sent a requisite number of times as defined by the system provider. In step 308, the UE waits to receive a confirmation response from the Node-B. In particular the UE waits for and ACK-STOP response which confirms that the system equipment has received and understood the STOP command. The UE and the system equipment now enter the SUSPEND mode in steps 310, 312 and 314, the UE sends a HOLD command during each available TTI and continue to do so until conditions are favorable such that the UE can resume receiving data without a relatively small likelihood of loss of data by the UE. In another embodiment, the UE sends a confirmation to the system equipment acknowledging the ACK-STOP confirmation response from the system equipment before the UE enters into the SUSPEND mode. Likewise, for this other embodiment, the system equipment enters into the SUSPEND after it has received a response from the UE acknowledging the ACK-STOP confirmation response from the system equipment.

In the SUSPEND mode, the UE stops receiving data from the system equipment or in an alternative embodiment, the UE continues to receive data, but at a lower rate than the established rate. The UE exits the SUSPEND mode when one or more favorable conditions occur. An example of a favorable condition is that the UE has emptied its buffer and is now ready to continue receiving data. Another example of a favorable condition is that the UE has removed enough data from its buffer so that the amount of information remaining in the buffer is below a defined threshold. It is obvious that the UE may decide to resume the reception of data from the system equipment based on other factors and not only the factors discussed above. Once the UE has detected favorable conditions, it enters the RECEIVE mode.

In step 316, the UE enters the RECEIVE mode by transmitting a START data flow control command a requisite number of times and waits for a confirmation response from the system equipment. The requisite number of times is defined by the system provider. The requisite number is equal to K where K is an integer equal to 1 or greater. In step 318, the UE receives an ACK-START confirmation response from the system equipment. In another embodiment the UE transmits a confirmation response to the system equipment acknowledging the reception of the ACK-START before the UE enters the RECEIVE mode. Also, for this other embodiment, the system equipment enters the RECEIVE mode after it has received a confirmation response to the ACK-START from the UE. The UE is now in the RECEIVE mode, in step 320, where it transmits CQI information to the system equipment over an uplink signaling channel and resumes the reception of data at the previously established rate (or at a rate higher than the lower rate of the SUSPEND mode) from the system equipment over a downlink traffic channel.

I claim:
1. A method of flow control between a User Equipment (UE) and system equipment of a wireless communication system, the method comprising:
   transmitting data to the UE at an established data rate in a RECEIVE mode;
   receiving a STOP data flow control command K times from the UE, where K is an integer equal to 1 or greater;
   transmitting an ACK-STOP confirmation to the UE;
   entering into a SUSPEND mode including stopping transmission of data to the UE or reducing transmission of data to the UE to a lower data rate that is lower than the established data rate;
   receiving a START data flow control command L times from the UE where L is an integer equal to 1 or greater;
   transmitting an ACK-START confirmation to the UE; and
   entering into the RECEIVE mode including resuming transmission of data to the UE at the established data rate or at a higher data rate than the lower data rate.

2. The method of claim 1 wherein the system equipment is at least one of a wireless communication system base station or base station equipment and the UE is a wireless communication system mobile station capable of transmitting data wirelessly to local devices and receiving data wirelessly from the local devices.

3. The method of claim 1 wherein the RECEIVE mode further comprises receiving CQI information from the UE.

4. The method of claim 1 wherein the SUSPEND mode further comprises receiving HOLD data flow control commands from the UE.

5. The method of claim 1 wherein the communication system is UMTS standard compliant where the STOP, and START data flow control commands are part of a set of TFRC signaling information that is sent over an HS-DPCCH and the ACK-START and ACK-STOP responses are sent over an HS-SCCH and where the system equipment is a Node-B.

6. The method of claim 1 further comprising receiving from the UE a confirmation response to the transmitted ACK-STOP confirmation and receiving from the UE a confirmation response to the transmitted ACK-START confirmation.

7. A method of flow control between a User Equipment (UE) and system equipment of a wireless communication system, the method comprising:
   receiving data from the system equipment at an established data rate in a RECEIVE mode;
   transmitting a STOP data flow control command K times to the system equipment, where K is an integer equal to 1 or greater;
   receiving an ACK-STOP confirmation from the system equipment;
   entering into a SUSPEND mode including stopping the reception of data from the system equipment or receiving data from the system equipment at a lower data rate that is lower than the established data rate;
   transmitting a START command to the system equipment L times where L is an integer equal to 1 or greater.
   receiving an ACK-START confirmation from the system equipment; and
   entering into the RECEIVE mode including resuming the reception of data from the system equipment at the established data rate or at a higher data rate than the lower data rate.

8. The method of claim 7 wherein the system equipment is at least one of a wireless communication system base station or base station equipment and the UE is a wireless communication system mobile station capable of transmitting data wirelessly to local devices and receiving data wirelessly from the local devices.

9. The method of claim 7 wherein the RECEIVE mode further comprises transmitting CQI information to the system equipment.

10. The method of claim 7 wherein the SUSPEND mode further comprises transmitting HOLD data flow control commands to the system equipment.

11. The method of claim 7 wherein the communication system is UMTS standard compliant where the STOP, and START data flow control commands are part of a set of TFRC signaling information that is sent over an HS-DPCCH and the ACK-START and ACK-STOP responses are sent over an HS-SCCH and where the system equipment is a Node-B.

12. The method of claim 7 further comprising transmitting to the system equipment a confirmation response to the received ACK-STOP confirmation and transmitting to the system equipment a confirmation response to the received ACK-START confirmation.

* * * * *